United States Patent
D'Angelo et al.

(10) Patent No.: US 9,850,960 B2
(45) Date of Patent: Dec. 26, 2017

(54) OVERMOULDED PROFILE BOOT CAN ASSEMBLY

(71) Applicant: GKN Driveline North America, Inc., Auburn Hills, MI (US)

(72) Inventors: Sam Junior D'Angelo, Royal Oak, MI (US); Samuel J. Oram, Rochester Hills, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 111 days.

(21) Appl. No.: 14/907,855

(22) PCT Filed: Mar. 19, 2014

(86) PCT No.: PCT/US2014/031180
§ 371 (c)(1),
(2) Date: Jan. 27, 2016

(87) PCT Pub. No.: WO2015/016981
PCT Pub. Date: Feb. 5, 2015

(65) Prior Publication Data
US 2016/0178014 A1    Jun. 23, 2016

Related U.S. Application Data

(60) Provisional application No. 61/861,248, filed on Aug. 1, 2013.

(51) Int. Cl.
*F16D 3/84* (2006.01)
*F16J 3/04* (2006.01)
*F16D 3/223* (2011.01)

(52) U.S. Cl.
CPC .............. *F16D 3/845* (2013.01); *F16J 3/042* (2013.01); *F16D 2003/22316* (2013.01)

(58) Field of Classification Search
CPC ...................... F16D 3/845; F16D 2003/22316
(Continued)

(56) References Cited

U.S. PATENT DOCUMENTS 3,830,083 A * 8/1974 Hadick ................... F16D 3/845
277/636
3,858,412 A    1/1975 Fisher et al.
(Continued)

FOREIGN PATENT DOCUMENTS

GB       1397515 A     6/1975
JP       H09166150     6/1997
(Continued)

OTHER PUBLICATIONS

EP Extended Search Report for EP Application No. 14833094.7 dated May 2, 2017 (8 pages).
(Continued)

*Primary Examiner* — Gregory J Binda
(74) *Attorney, Agent, or Firm* — Jennifer M. Brumbaugh; Reising Ethington P.C.

(57) ABSTRACT

In at least some implementations, a constant velocity joint includes a first rotational member and a boot can assembly coupled to the first rotational member. The boot can assembly includes a boot can, a boot and a seal carried by the boot can and arranged to engage and seal against the first rotational member when the boot can assembly is coupled to the first rotational member. The boot and seal may be formed from the same piece of material and may be bonded to the boot can. The boot and seal may be overmolded onto the boot can.

15 Claims, 5 Drawing Sheets

(58) Field of Classification Search
USPC ............. 464/173–175; 277/634–636; 403/51
See application file for complete search history.

(56) References Cited

U.S. PATENT DOCUMENTS

| | | | |
|---|---|---|---|
| 4,371,049 | A | 2/1983 | Goeft et al. |
| 4,558,869 | A | 12/1985 | Grove et al. |
| 4,936,811 | A * | 6/1990 | Baker ................ F16D 3/845 |
| | | | 277/636 |
| 5,582,546 | A | 12/1996 | Welschof |
| 5,725,433 | A | 3/1998 | Kudo et al. |
| 7,677,984 | B2 | 3/2010 | Hahn et al. |
| 7,997,988 | B2 | 8/2011 | Wormsbaecher et al. |
| 2005/0054453 | A1 | 3/2005 | Kozlowski et al. |
| 2007/0173337 | A1 | 7/2007 | Wormsbaecher et al. |
| 2012/0248712 | A1 * | 10/2012 | Mitsui ................ F02B 75/041 |

FOREIGN PATENT DOCUMENTS

| | | |
|---|---|---|
| JP | H09166150 A | 6/1997 |
| RU | 2036342 C1 | 5/1995 |
| SU | 427181 A1 | 5/1974 |
| WO | WO2013043166 A1 | 3/2013 |

OTHER PUBLICATIONS

Written Opinion & International Search Report for PCT/US2014/031180 dated Mar. 19, 2014, 6 pages.

* cited by examiner

OVERMOULDED PROFILE BOOT CAN ASSEMBLY

REFERENCE TO RELATED APPLICATIONS

This application is the National Stage of International Application No. PCT/US2014/031180, filed Mar. 19, 2014, which claims the benefit of U.S. Provisional Application Ser. No. 61/861,248 filed on Aug. 1, 2013, the entire contents of which are incorporated herein by reference.

TECHNICAL FIELD

Described herein is a constant velocity joint and an improved boot can sealing assembly therefore.

BACKGROUND

Constant velocity joints (CV joints) are common components in vehicles. CV joints are often employed where transmission of a constant velocity rotary motion is desired or required. CV joints are typically greased or otherwise lubricated for the life of the component. The joints are preferably sealed to retain the lubricant inside the joint while keeping contaminants and foreign matter, such as water and dirt, out of the joint. A boot, which may be made of rubber, thermoplastic, silicone material, or the like, usually encloses portions of the CV joints. The boot provides a flexible barrier to retain the grease in the joint so as to reduce friction and extend the life of the joint.

Figure 7:
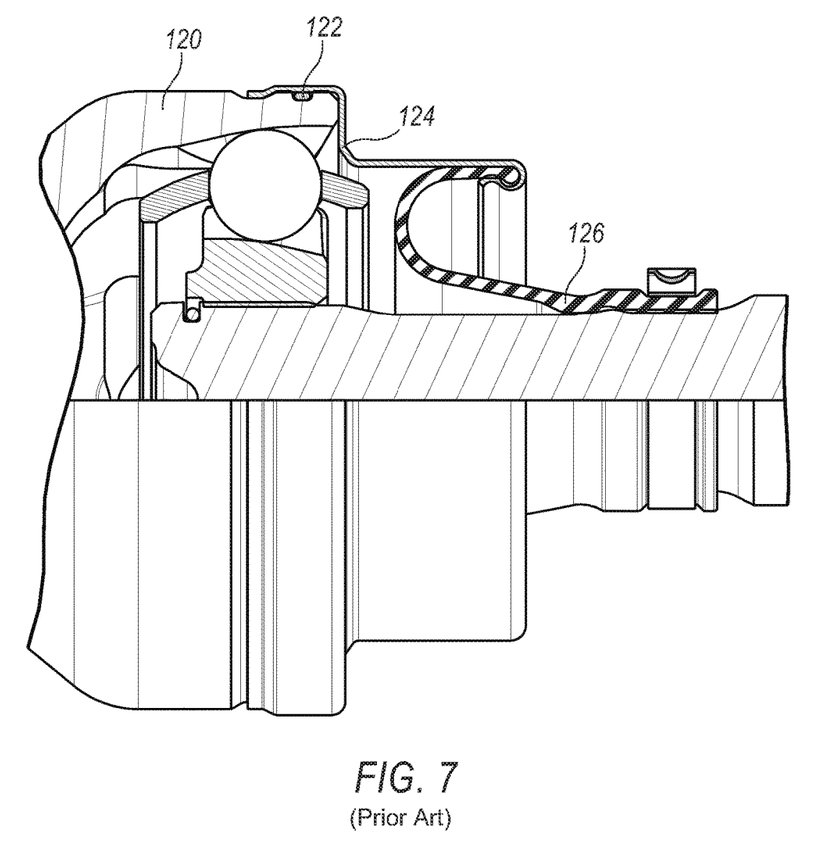
FIG. 7 is a sectional view of a prior art boot can assembly that includes an O-ring.

FIG. 7 shows a prior art boot can assembly that comprises a boot can 124 in combination with a boot 126 that may be secured to a shall or rotational member 120 of the CV joint with an o-ring 122 between the boot can and rotational member. Among other issues, using an o-ring adds additional components and handling during assembly. Furthermore, in using an o-ring, additional risks exist in that the o-ring may become damaged, missed, or removed during assembly.

SUMMARY

In at least some implementations, a constant velocity joint includes a first rotational member and a boot can assembly coupled to the first rotational member. The boot can assembly includes a boot can, a boot coupled to the boot can, and a seal formed in one piece with the boot, carried by the boot and arranged to engage said first rotational member when said boot can assembly is coupled to said first rotational member. The boot and seal may be formed from the same piece of material and may be bonded to the boot can. The boot and seal may be overmoulded onto the boot can.

A boot can assembly for a constant velocity joint includes a boot, a boot can, a seal formed from the same piece of material as and carried by the boot and configured to surround at least a portion of a first rotational member. The boot can at least partially embedded in the boot and radially overlaps the seal. The boot can and the boot are coupled together without an additional connection member. In at least some implementations, the boot can and boot are bonded together such as may occur when the boot is overmoulded onto the boot can. This bonding may occur without a bonding agent between the boot and boot can, and no clamp, fastener or other connector is needed, in at least some implementations, to maintain the connection between and coupling of the boot and boot can. In some implementations, the boot may overlap two axially opposed surfaces to maintain the position of the boot relative to the boot can and inhibit unintended removal of the boot from the boot can.

DETAILED DESCRIPTION

Referring to the drawings, a constant velocity joint (CV Joint) is shown. It should be noted that all types of CV joints, such as plunging tripods, fixed ball joints, etc., may be used with the present disclosure. Advantages realized by the disclosure may be applied to substantially all types of constant velocity joints, and, therefore, the disclosure should not be limited to the illustrated embodiments.

Further, references in the specification to "one embodiment" or "an embodiment" means that a particular feature, structure, or characteristic described in connection with the embodiment is included in at least one embodiment. The appearances of the phrase "in one embodiment" or "in one implementation" in various places in the specification are not necessarily all referring to the same embodiment.

Disclosed herein is a profile boot can assembly for a CV joint which may have a boot, a first rotational member and a second rotational member. The boot may be overmoulded onto a boot can that is secured to the first rotational member in order to secure the boot to the CV joint. The boot may be overmoulded concurrently with a seal to the boot can, thus eliminating a manufacturing and/or assembly step. In other words, the boot and seal may be formed from and define two features in the same piece of material instead of being defined by two separate pieces of material. In this manner, the seal may be carried by the boot and, when the boot is secured to the boot can, the boot and seal may be considered to be carried by the boot can, and vice versa. Further, because the boot can secures the boot to the first rotational member, the need to seal the boot can to the first rotational member via a traditional o-ring is eliminated.

Figure 1:
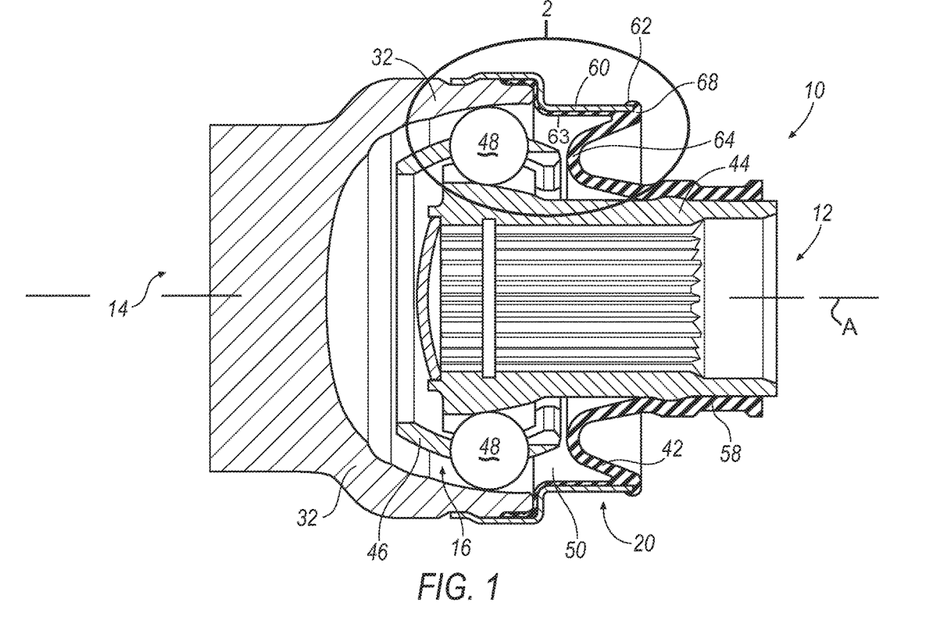
FIG. 1 is a sectional view of a profile boot can sealing assembly.

Referring to FIG. 1, one implementation of a CV joint 10 includes a driving end 12 and a driven end 14, and has a central axis (A). The CV joint 10 further includes a joint assembly 16 coupled to a shaft (not shown) with a boot can assembly 20 connected there between.

The boot can assembly 20 may include a flexible CV joint boot 42 and a boot can 60. The boot 42 may include a main portion with a boot neck 58 and at least one bellow 64. The boot neck 58 may abut against and/or be clamped to a second rotational member or inner race 44, described below. The bellow 64 may extend between the boot neck 58 and a distal end 68. The bellow 64 may form a lip 62 at the distal end 68. The boot can assembly 20 protects the moving parts of the CV joint 10 during operation by retaining the grease or lubricant inside the joint 16 while keeping contaminants and foreign matter, such as water and dirt, out of the joint assembly 10.

The joint assembly 16 may include a cage 46, a first rotational member or outer race 32, the second rotational member or inner race 44, and a plurality of balls 48. The cage 46 retains the halls 48 between the first rotational member 32 and the second rotational member 44 in a generally equally spaced circumferential orientation. A shaft (not shown) may be splined to the second rotational member 44 for co-rotation with the second rotational member 44.

Collectively, at least the shaft (when assembled to the CV joint), the boot can assembly 20, the first rotational member 32, and the second rotational member 44, form a joint chamber 50. The joint chamber 50 contains grease or other lubricants (not shown) for lubrication between the cage 46, the first rotational member 32, the second rotational member 44, and the balls 48. During operation of the CV joint 10, lubricant contained within joint chamber 50 will generally be drawn outwards towards first rotational member 32 by centrifugal forces generated by the spinning of the CV joint 10.

Figure 2:
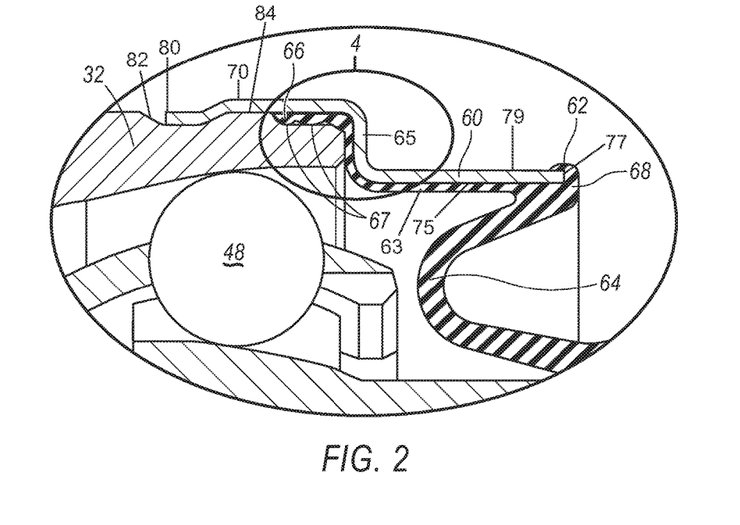
FIG. 2 is an enlarged view of encircled area 2 of FIG. 1.
Figure 3:
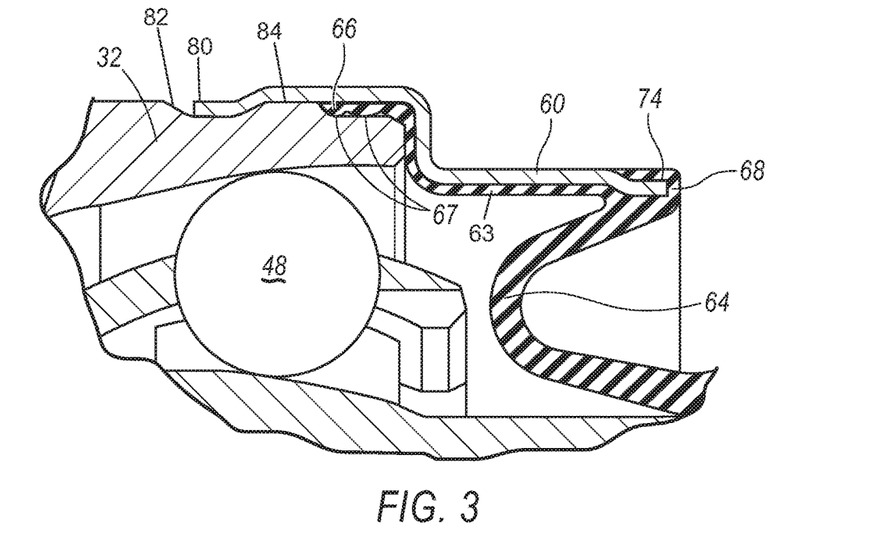
FIG. 3 is an enlarged view of a portion of another boot can sealing assembly.

The boot can 60 may be configured to maintain the boot 42 coupled to the first rotational member 32. The boot can 60 may form a cylindrical body arranged at least in part around the outside of the boot 42 to secure the boot 42 to the CV joint 10. To facilitate connection to the CV joint 10, the boot can 60 may be a metal or plastic material capable of being connected to the first rotational member 32 such as by being crimped, staked and/or clamped at or adjacent to one end of the boot can. As shown in FIGS. 2 and 3, an end 80 of the boot can 60 is crimped or rolled into a circumferential recess or groove 82 in the first rotational member 32. The boot can 60 may be somewhat rigid to provide structural support for the boot and seal, and to protect from damage at least some portion of the boot and seal. The boot 42 may also include a seal 66 (FIGS. 2-4, 6A, 6B) extending axially and circumferentially around the inside of the boot can 60. The seal 66 may have a plurality of ribs 67 extending radially inwardly therefrom. The ribs 67 may create a plurality of recesses between the ribs 67 and may be configured to abut and form a sealed connection with the first rotational member 32. The seal 66 may be formed of a flexible material such as an elastomer, flexible plastic, rubber, etc.

The seal 66 may be molded onto the boot can 60 or otherwise carried by the boot can 60 to provide a seal between the boot can 60 and first rotational member 32. Once the boot is placed on the joint 10, the boot can 60 may extend around at least a portion of the seal 66 and at least a portion of the first rotational member 32, as shown in the drawings. During production, the seal 66 may be molded concurrently with the boot 42. That is, the boot 42 and the seal 66 inside the boot can 60 may be overmoulded onto the boot can 60 at the same time so that the boot 42 and seal 66 are integral features in a one-piece body formed from one or more materials. In the implementation shown, the boot 42 includes the seal 66, the main portion (shown in one implementation as including bellows 64 and boot neck 58) and an extension 63 interconnecting the main portion and seal 66. The extension 63 may extend axially between the bellows 64 and seal 66 and circumferentially about an interior of the boot can 60. By concurrently overmoulding the boot 42 and the seal 66 to the boot can 60, an additional step is removed from the manufacturing process, and all three features may be handled as a single part to facilitate handling and assembly. Further, the boot 42, boot can 60 and seal 66 may be coupled together without the need for a connection member that is not integral with and is a separate component from either the boot 42 or boot can 60, such as a clamp, fastener or other device to hold them together. That is, one or more of bonding, adhesion and embedding portions of the boot can 60 in the boot 42 is sufficient, in at least certain implementations, to maintain the boot 42, boot can 60 and seal 66 as a single unit or part.

The boot can assembly 20 may later be pressed onto the first rotational member 32, with a press-fit between the boot can 60 adjacent its end 80 and a portion 84 of the first rotational member. The area of the press-fit may be located between the end 80 of the boot can 60 and the area of the seal 66. The boot can 60 may then be radially crimped or otherwise secured to the first rotational member 32 with at least part of the seal 66 radially overlapping part of the first rotational member 32 and part of the boot can radially overlapping the seal and the first rotational member 32. This may eliminate the need to use an additional o-ring to seal the chamber 50.

FIG. 2 illustrates an enlarged view of encircled area 2 of FIG. 1 which includes a portion of the boot 42 and boot can 60. As shown, an end of the boot can 60 may be received in (e.g. at least partially embedded in) and overlapped by the lip 62 of the distal end 68 of the boot 42. Thus, in at least some implementations, the boot can 60 may be overlapped on two or more sides by the boot 42. These sides include a radially inner surface 75 (acing the chamber 50, see e.g. FIG. 2), an axial end surface or edge 77, and a radially outer surface 79 (facing away from chamber 50). In the implementation shown, the boot can is partially overlapped and coupled to the boot 42 on all three sides noted above. The boot can 60 may include a protruded portion 70 that includes end 80 and extends and is crimped into the recessed area 82 located on the first rotational member 32. The protruded portion 70 is configured to receive and surround at least a portion of the first rotational member 32 and to trap the seal 66 between the protruded portion 70 and the first rotational member 32. Between the boot end 68 and seal 66, the boot 42 may be received within the boot can, and may be adhered or otherwise bonded to the boot can in that area, if desired. In at least some implementations, such bonding may occur between the materials of the boot and boot can during overmoulding of the boot 42 onto the boot can 60 and may be done with or without an adhesive or other bonding agent.

FIG. 3 illustrates an enlarged view of a portion of a boot 42 and boot can 60. In this example, an end 74 of the boot can 60 may be tapered or inclined radially inward towards the boot bellows 64. The end 74 may be overmoulded or otherwise overlapped by the distal end 68 of the boot 42. However, it may not be necessary for an outwardly extending tip to extend over the boot can 60 (as shown, for example, in FIG. 1), and the exterior side of the boot 42 may be substantially flat, with the end 68 of the boot 42 generally flush with an exterior surface of the boot can 60 as shown in FIG. 3.

Figure 4:
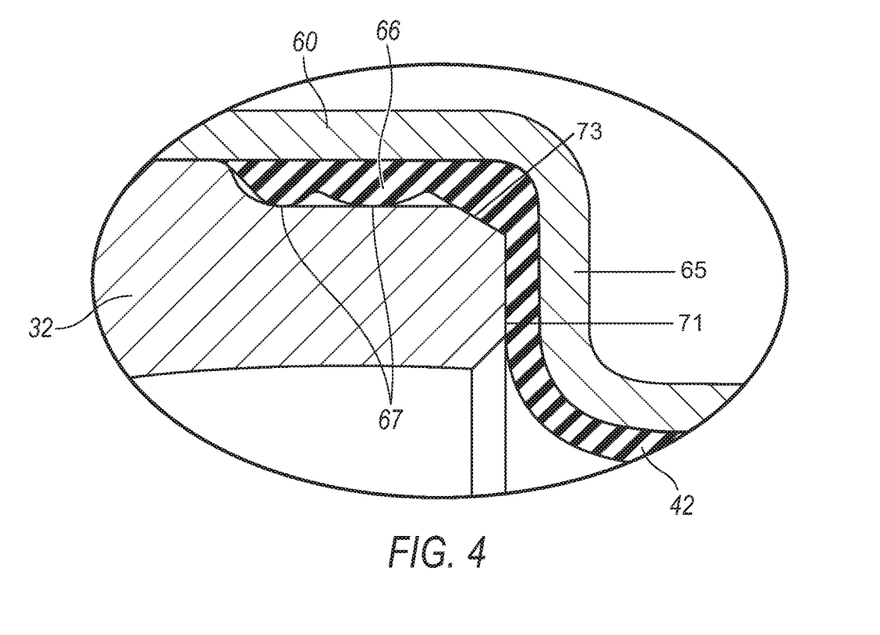
FIG. 4 is an enlarged view of encircled area 4 of FIG. 2.

FIG. 4 is an enlarged view of encircled area 4 of FIG. 2 showing a portion of a boot can 60 and boot 42. Upon press-fitting the boot can 60 with overmoulded seal 66 onto the first rotational member 32, at least one sealing area is created due to contact between the ribs 67 of the seal 66 of and the surface of the first rotational member 32. Multiple areas of surface contact 76 may also be achieved, as shown in FIGS. 4 and 6B, where each rib 67 engages and is compressed against the first rotational member 32 and an area of the boot 42 spaced from the ribs also engages the first rotational member 32, such as at or near a corner or edge 71 of the first rotational member 32. A further contact area 76, in the illustrated implementation, may occur at a beveled edge 73 (see e.g. FIGS. 4 and 6A) of the first rotational member that leads to the edge 71. To improve contact between the boot/seal in these areas, the boot can 60 may include a transition portion 65 (see e.g. FIGS. 2 and 4) configured to create a plurality of contact points between the seal 66 (and/or the boot 42 spaced from the seal 66) and the first rotational member 32. The transition portion 65 may extend radially from the axially oriented protruded portion 70 and define a surface confronting an axial end of the first rotational member to trap a portion of the boot and/or seal between the transition portion and the end of the first rotational member. The transition portion 65 axially engages and may compress the boot/seal against the inner rotational member 32 at least in one area, and another part of the boot can (e.g. protruded portion 70) radially engages and may compress the seal 66 against the inner rotational member 32 in another area. Thus, in addition to the three surfaces 75, 77, 79 of the boot can 60 that are overlapped by the boot 42 as noted above, the boot 42 also overlaps the transition portion 65 of the boot can 60 in at least this implementation. With the transition portion 65 facing the opposite direction as (i.e. being axially opposed to) the end surface 77, the boot 42 may be trapped on or mechanically interlocked to the boot can 60 to prevent or at least inhibit unintentional separation of the boot from the boot can.

The boot 42 may be sealed to the first rotational member 32 at the areas of surface contact when the boot can assembly 20 is pressed onto the first rotational member/outer race 32. By creating multiple areas of surface contact, a seal between the boot and first rotational member that prevents contamination or the leakage of grease from the joint chamber is firmly maintained even in the event that one of the ribs 67 is damaged and the seal may be more effective than a single seal such as an o-ring. Also, because the areas of surface contact between the seal 66 and the first rotational member 32 are located within the interior of the boot can 60, they are protected from damage during operation.

Figure 5:
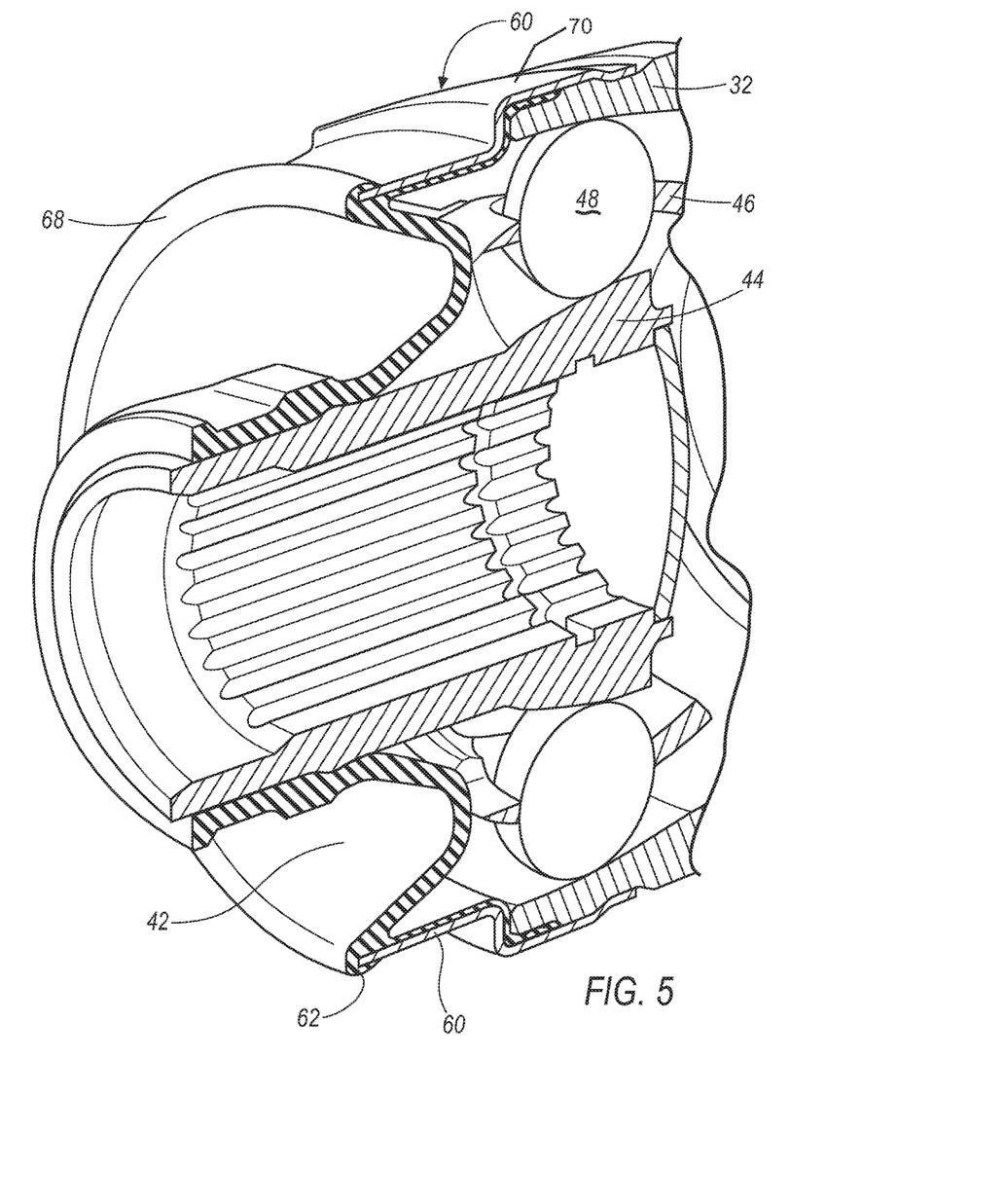
FIG. 5 is a perspective cross-sectional view of a profile boot can assembly.

FIG. 5 is a perspective cross-sectional view of a CV joint 10. As shown, the lip 62 of the boot 42 may receive the end of the boot can 60. The protruded portion 70 of the boot can 60 may receive a portion of each of the boot 42 and the first rotational member 32. Although certain areas 76 (FIG. 6B) of surface contact are shown, additional and/or different and/or fewer areas of surface contact may also exist between the boot 42 and the first rotational member 32.

Figure 6A:
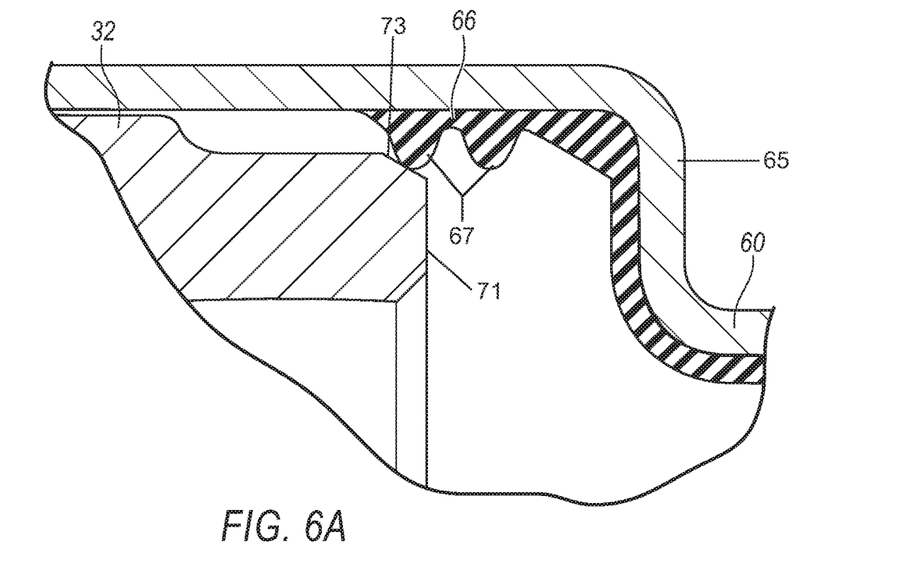
FIG. 6A is an enlarged view of a portion of a boot can seal assembly prior to being pressed onto a first rotational member.
Figure 6B:
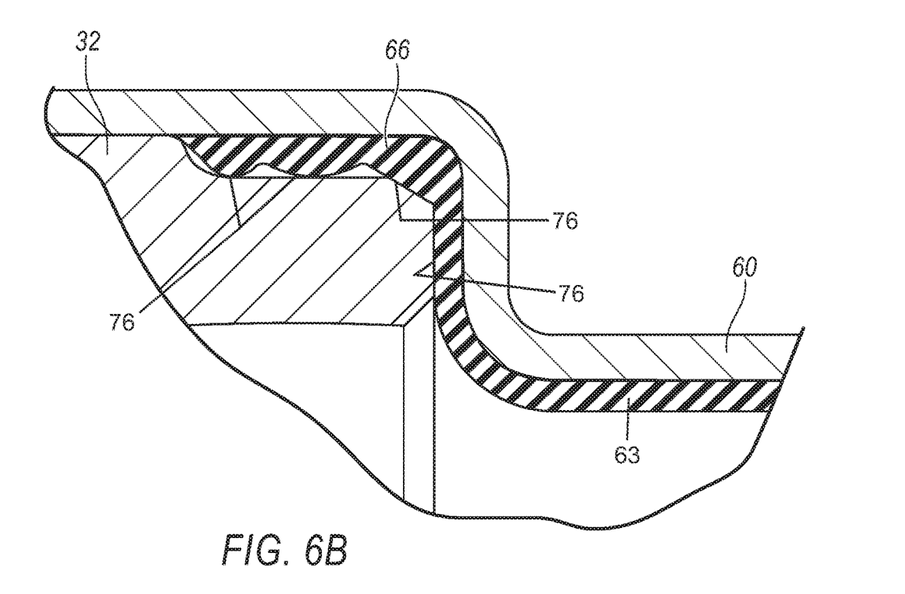
FIG. 6B is an enlarged view of a portion of a boot can seal assembly after the assembly has been pressed onto the first rotational member.

FIGS. 6A and 6B are enlarged views of a boot can seal assembly in which FIG. 6A illustrates the first rotational member 32 being separated from the boot can assembly 20 prior to the assembly being press fitted onto the first rotational member 32. Referring to FIG. 6B, the boot can assembly 20 is pressed onto the first rotational member 32, wherein the ribs 67 of the seal 66 are compressed and partially flattened upon contact with multiple areas on a surface of the first rotational member 32 in order to create a seal therebetween.

Because the boot can 60 may be press-fitted onto, or otherwise secured to the first rotational member 32, the seal 66 creates at least one area of surface contact with the first rotational member 32, and a traditional o-ring around the first rotational member is unnecessary. By eliminating the need for an o-ring, or other attachment mechanism, the number of components for the joint 10 may be reduced. This may lead to cost savings, the elimination of costly checks to verify the presence and position of the o-ring, higher quality assembly due to the seal 66 having multiple areas of surface contact with the first rotational member 32, and reduced sealing system failures.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead with reference to the appended claims, along with the full scope of equivalents to which such claims are entitled. It is anticipated and intended that future developments will occur in the arts discussed herein, and that the disclosed assemblies and methods will be incorporated into such future embodiments. In sum, it should be understood that the invention is capable of modification and variation that is limited only by the following claims.

All terms used in the claims are intended to be given their broadest reasonable construction and their ordinary meanings as understood by those skilled in the art unless an explicit indication to the contrary is made herein. In particular, use of the singular articles such as "a," "the," "said," etc, should be read to recite one or more of the indicated elements unless a claim recites an explicit limitation to the contrary. Further, the terms "axial" or "axially" and "radial" or "radially" are used for ease of description with reference to the identified axis or axes; these terms are not intended to be limiting and other terms like lateral, longitudinal, inward, outward or the like are intended to be covered and not excluded.

What is claimed is:

1. A constant velocity joint, comprising:
a first rotational member having a central axis; and
a boot can assembly coupled to the first rotational member and having a boot can that has a transition portion perpendicular to said central axis, a boot coupled to the boot can, and a seal formed in one piece with the boot, carried by the boot, and engaged with said first rotational member, and wherein said seal includes a plurality of ribs extending from said boot and engaged with said first rotational member; and
wherein said boot includes an extension received between and engaged by said transition portion and said first rotational member and interconnecting said seal and said boot.

2. The joint of claim 1, wherein said seal including said ribs and said boot are features defined in the same piece of material that is bonded to and carried by said boot can.

3. The joint of claim 2, wherein said boot can is configured to create a plurality of contact areas between said seal, said boot and said first rotational member.

4. The joint of claim 3, wherein the contact areas include at least one area of radial compression against said first rotational member and at least one area of axial compression against said first rotational member.

5. The joint of claim 1, wherein said plurality of ribs extend inwardly from said boot and are engaged with said first rotational member.

6. The joint of claim 1, wherein recesses are provided between said ribs and the ribs provide multiple areas of contact with the first rotational member.

7. The joint of claim 1, wherein said boot includes said seal and an end of said boot overlaps an end of said boot can and is coupled to said boot can, and said seal and said end of the boot are integrally formed from the same piece of material.

8. The joint of claim 1, wherein said boot can is crimped on to said first rotational member to maintain said boot can assembly coupled to said first rotational member.

9. The joint of claim 1, which also includes a second rotational member and wherein the boot includes a main portion with a boot neck and an extension interconnecting the main portion and the seal, and extending axially between the seal and the main portion of the boot and circumferentially about an interior of the boot can.

10. The joint of claim 1 wherein the boot overlaps two axially opposed surfaces of the boot can so that the boot and boot can are mechanically interlocked to at least inhibit unintentional separation of the boot and boot can.

11. The joint of claim 1 wherein the seal surrounds at least a portion of the first rotational member, and includes at least one rib of said plurality of ribs extending from said boot and engaged with said first rotational member and the boot can is at least partially embedded in said boot and radially overlaps said seal, wherein said boot can and said boot are coupled together without an additional connection member.

12. The assembly of claim 11, wherein said at least one rib extends radially away from said boot can and is compressed between the boot can and the first rotational member.

13. The assembly of claim 11, wherein said boot overlaps at least two sides of said boot can.

14. The assembly of claim 11, wherein said boot also radially overlaps part of an inner surface of said boot can and part of an outer surface of said boot can.

15. The assembly of claim 11 wherein the boot overlaps two axially opposed surfaces of the boot can so that the boot and boot can are mechanically interlocked to at least inhibit unintentional separation of the boot and boot can.

\* \* \* \* \*